April 26, 1949.  F. ABELL  2,468,708
BEAN STRAW SEPARATOR
Filed Nov. 21, 1942
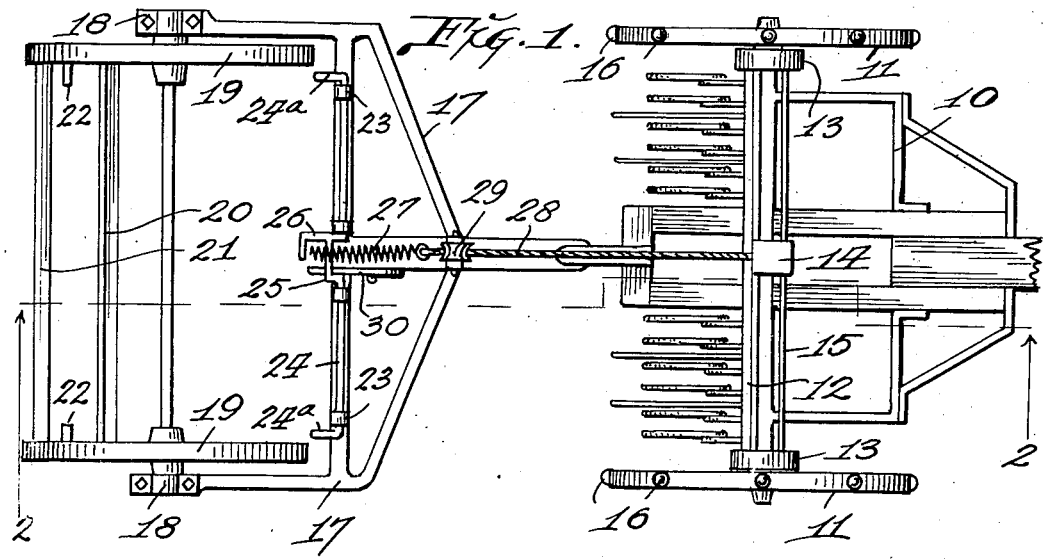
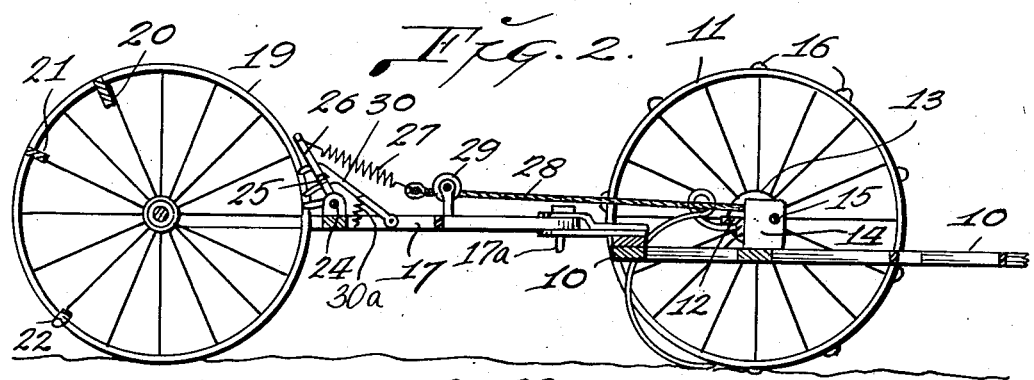
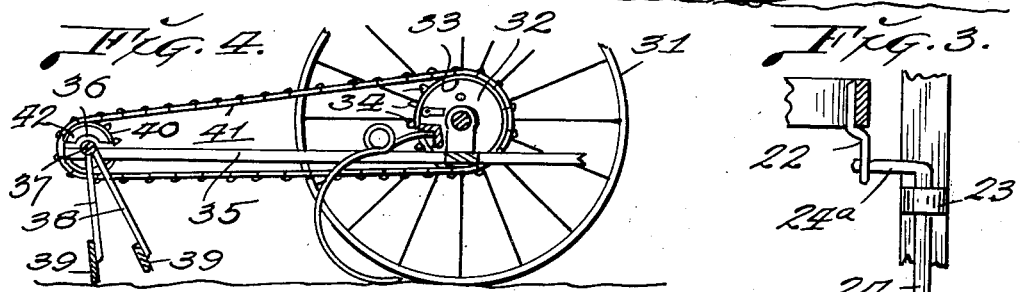
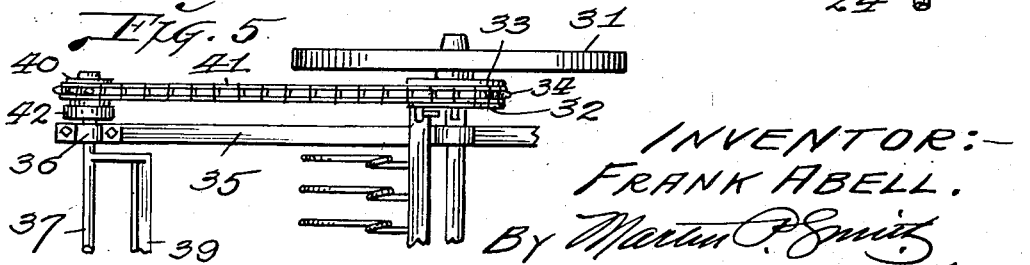
INVENTOR:—
FRANK ABELL.
By Martin P. Smith
ATTY.

UNITED STATES PATENT OFFICE 2,468,708

BEAN STRAW SEPARATOR

Frank Abell, Inglewood, Calif., assignor of one-half to Louis R. Stephens, Los Angeles, Calif.

Application November 21, 1942, Serial No. 466,464

2 Claims. (Cl. 56—386)

My invention relates to a separator particularly designed for use during bean harvesting operations, for the convenient and efficient separation of bean straws or vines, into spaced piles upon the ground.

In using a new type of bean thresher now in general use and termed a "pickup" thresher, it has been found particularly advantageous to separate the bean vines into small piles so that a series of such piles are fed to the thresher cylinder, instead of a continuous feed. This prevents uneven feeding because the cylinder cannot draw more than one pile at a time.

I propose to separate the vines into piles either before or after they have been placed in one windrow and where my invention is operated directly behind a cutter, the vines are first separated into piles, after which a side-delivery rake is used to rake the piles into one row, but, due to the fact that they have once been separated, they more or less, remain in that condition.

Among the principal objects of my invention are, to provide for the more efficient and uniform feeding of bean vines to the threshing machine, thereby saving more of the crop in addition to materially decreasing wear and tear on the threshing machine, and, further, to provide simple and efficient means which will separate heavy vines, thereby materially reducing much arduous hand labor.

A further object of my invention is, to provide means whereby bean vines may be piled immediately after being cut, thereby avoiding the common practice of farmers allowing their beans to dry for several days after cutting, on account of the vines being too heavy to pile immediately after cutting.

This early piling makes for easier threshing and more of the weight of the bean is obtained from the vine, due to the fact that early piling causes the beans to go through a sweat, as well as preventing rapid drying, which latter condition exists where unpiled beans are exposed for some time to sun and wind.

A further object of my invention is, to provide a separator of the character referred to, which is of simple, inexpensive construction and which may be associated with the conventional hay rakes used by practically all farmers.

A further object of my invention is to provide a vine or straw separator which will enable farmers to harvest their bean crops with minimum labor, even where the beans are not threshed with pickup threshers and by using a side delivery rake, either before or after piling, a still further saving of labor may be effected in the harvesting functions.

A further object of my invention is to produce more uniform sized piles, which aids materially in the harvesting and curing of crops.

A further object of my invention is to provide a separator which will in operation, pick up very little, if any dirt and which undesirable result frequently occurs where the bean vines have not been properly cut and are partly buried in the ground.

I propose to accomplish this result, by placing blocks on the rims of the wheels of the rake, so as to shake or vibrate the latter as it moves forward, thereby shaking the dirt from the vines as the same are picked up by the rake teeth.

With the foregoing and other objects in view, my invention consists in certain novel features of construction and arrangement of parts, which will be hereinafter more fully described and claimed and illustrated in the accompanying drawings, in which:

Fig. 1 is a plan view of my improved bean straw separator and showing same associated with a conventional hay rake.

Fig. 2 is a vertical section taken lengthwise on the line 2—2 of Fig. 1.

Fig. 3 is a detail view partly in section and showing a portion of the means utilized for tripping the rake from the wheels of the separator.

Fig. 4 is a vertical longitudinal section taken through the center of the modified form of a separator.

Fig. 5 is a plan view of the side portion of the modified form of separator.

Referring by numerals to the accompanying drawings, which illustrate a preferred embodiment of my invention, 10 designates the frame of a conventional hay rake, 11 designates the wheels thereof, 12 designates the rake teeth carrying bar, 13 designates the dumping dogs between the bar and wheel hubs, 14 designates the housing containing the bar tripping mechanism and 15, the rod which extends from the tripping mechanism to the dumping dogs.

All of the parts just described are to be found in a standard type of hay rake, and form no part of my invention. The particular rake with which my improved bean straw separator has been combined and successfully used in the field, is disclosed in U. S. Letters Patent #1,000,438 issued Aug. 15, 1911 the Charles Pearson, Chicago, Illinois, assignor to International Harvestor Co., which patent includes a trip lever 26, to which is connected, a cable running forwardly from my improved separator.

There are several other patented rakes with which my improved separator may be readily combined, among which may be mentioned #1,812,035 issued June 30, 1931 to Carlson, also Patents No. 1,850,384 and #1,850,385, both issued March 22, 1932, to Coultas and assigned to Deere Co., Moline, Illinois. In order to impart vibration to the rake teeth for the purpose of shaking dirt from the vines as they are picked up, I provide on the rims of the wheels 11, short blocks 16 which contact with the ground and slightly lift the wheels as they travel forward, and said wheels dropping slightly as the blocks leave the ground.

Pivoted at 17a to the rear central portion of rake frame 10 is the forward end of a frame 17, having in its rear portion, bearings 18, for an axle, and the latter having fixed thereon, wheels 19, having the same diameter as the rake wheels 11.

Secured to the rims of wheels 19, are the ends of a transverse vine engaging and pressing bar 20 and a somewhat similar pressure bar 21 is secured to the wheel rims, a short distance, for instance 12 or 18 inches to the rear of the primary bar 20.

Secured to the rims of the wheels 19, at points to the rear of bar 21 are the ends of transversely aligned short inwardly projecting trip fingers 22, the inner end portions of which are disposed in the same transverse plane with or slightly beyond the rims of the wheels (see Fig. 3).

Journalled in bearings 23 on the front portion of frame 17 is a transverse rod 24, the ends thereof being bent rearwardly so as to form short arms 24a which lie directly in paths of travel of trip fingers 22.

The central portion of rod 24 is formed into an upwardly and rearwardly projecting crank 25 and projecting upwardly and rearwardly from said crank is an arm 26.

Secured to the upper end of arm 26, is the rear end of a spring 27, the forward end of the latter being secured to a flexible member 28, for instance, a cable, which passes forwardly beneath a pulley 29 mounted on frame 17, and the forward end of said cable is connected to the trip mechanism in housing 14.

A latching arm 30 is pivotally mounted on frame 17 and engages crank 25, to limit the forward movement thereof, due to the pull of spring 27 and said arm 30 is held in latching engagement with said crank, by a retractile spring 30a connected at one end to frame 17.

In operation, the rake and wheeled frame 17 are drawn forward and rake teeth gather bean vines and draw same forwardly over the ground and at periodic intervals the rake teeth are elevated to release and dump the vines in regularly spaced piles.

After a pile of vines has been dumped from the rake teeth, the latter swing downward into normal raking position, and ordinarily, or without some vine separating means, there is a marked tendency for the rake teeth to drag some of the vines from the last dumped pile to the next pile to be made.

The wheels 19 of the separator, are timed so that the primary pressure bar 20 engages the ground immediately ahead of the last formed pile, thereby pressing the vines on the ground as the rake teeth move forward to rake the vines which form the next pile. Immediately following the engagement of bar 20 with the ground, the secondary pressure bar 21 engages the ground and vines thereon, to complete the separation of the vines before the rake dumps the next pile.

The separation of the vines is effected as the rake moves forward during the time period that the pressure bars 20 and 21 are in contact with ground and pressing the vines thereupon.

A short time after the vines have been separated and the bars 20 and 21 travel upward and forward, the fingers 22 contact with and swing crank arms 24a downward, so as to rock shaft 24, thereby swinging crank 25 and arm 26 downward and rearward, to pull spring 27 and cable 28 rearwardly. This pull on cable 28 actuates the mechanism in housing 14, to move trip rods 15, in turn causing the dumping dogs to act and rotate rake bar 12 and thereby lift the rake teeth and dump the raked vines therefrom.

Immediately following this movement, the rake teeth swing downward into raking position and following such action, the pressure bars 20 and 21 move downward to engage the vines on the ground ahead of the pile just dumped by the rake. Thus, the bean vines are effectually separated between the piles formed by the rake and dragging of the vines from the piles as they are intermittently formed by the rake, is eliminated.

After the rake has been dumped as just described, rock shaft 24 crank arms 24a, crank 25 and arm 26 return to their normal positions under the influence of retractile spring 27.

In the modified construction illustrated in Figs. 4 and 5, the hubs of the wheels 31 of a conventional rake have dumping dogs 32 which include circular outer housings 33 having ratchet teeth 34.

The frame of the rake is extended rearwardly as designated by 35 and provided with bearings 36, for a transverse shaft 37. Secured to the ends of arms 38 which project radially from shaft 37 are vine engaging pressure members 39.

Mounted on one end of shaft 37 is a sprocket wheel 40 and connecting same and the toothed housing 33 of the corresponding dumping dog is a sprocket chain 41. In this modified structure, the dumping dog is actuated periodically to dump the rake and shaft 37 operates in proper time relation to the travel of the rake, so that the pressure bars 39 engage and press the vines onto the ground just beyond each pile of vines, thereby bringing about the desired separation of vines between the piles and which separation eliminates the dragging of the vines from one pile to the next. A conventional slip clutch 42 provides a yielding connection between sprocket wheel 40 and shaft 37.

In the preferred embodiment of my invention, the spacing of the piles of straw is governed by the size of the wheels 19. While in the modified construction, the spacing of the piles is governed by the relative size of the sprocket wheel 40 and the sprocket on the hub of wheel 31.

Thus, it will be seen that I have provided a bean straw separator that is simple in construction, inexpensive of manufacture and very effective in performing the functions for which it is intended.

It will be understood that minor changes in the size, form and construction of my improved bean straw separator may be made and substituted for those herein shown and described without departing from the spirit of the invention, the scope of which is set forth in the appended claims.

I claim as my invention:

1. A vine separator for self dumping rakes adapted to rake vines into piles, comprising rotary means including a pair of wheels and a pair of cross bars interconnecting the rims of said wheels and spaced apart circumferentially thereof, said rotary means adapted to be connected to said rake and to traverse the ground immediately to the rear thereof, for pressing vines onto the ground and effecting a separation thereof from the pile formed by said rake.

2. A vine separator for wheeled rakes comprising a frame carried by and positioned to the rear of the rake, a pair of spaced members mounted for rotation on said frame and a pair of transversely disposed circumferentially spaced rails interconnecting the peripheral portions of said rotary members for engaging and pressing vines and the like against the ground and thereby separate said vines from the pile formed by the rake.

FRANK ABELL.

REFERENCES CITED

The following references are of record in the file of this patent:

UNITED STATES PATENTS

| Number | Name | Date |
|---|---|---|
| 1,059,898 | Moore | Apr. 22, 1913 |
| 1,188,190 | Masterson | June 20, 1916 |
| 1,373,832 | Reinbold et al. | Apr. 5, 1921 |
| 1,534,112 | Graham | Apr. 21, 1925 |
| 1,647,064 | Vance | Oct. 25, 1927 |
| 1,816,074 | Clark | July 28, 1931 |